Patented Mar. 20, 1934

1,951,742

UNITED STATES PATENT OFFICE 1,951,742

FERTILIZER

Milton W. St. John, O'Hara Township, Allegheny County, Pa., assignor to Jones & Laughlin Steel Corporation, Pittsburgh, Pa., a corporation of Pennsylvania No Drawing. Application January 18, 1932, Serial No. 587,444

7 Claims. (Cl. 71—9)

This invention relates generally to fertilizers for plants, and more particularly to a fertilizer containing ammonium sulphate and a relatively stable alkaline material which is available for counteracting the acid produced by the sulphate when it is decomposed by reactions in the soil.

Ammonium sulphate is obtainable in large quantities as a by-product in the manufacture of lighting gas or metallurgical coke. It has been used heretofore on a rather extensive scale as a fertilizer for plants, but is open to the objection that it renders the soil acid and, therefore, is not conducive to the production of good crops. When ammonium sulphate is added to soil, the plants derive nitrogen therefrom but the acidity of the soil is gradually but progressively increased, and, as stated above, this deleteriously affects the growth of plant life. The continued use of ammonium sulphate renders the soil so acid that it is necessary to add some alkaline material, for example lime, in order to counteract the acid. This may be done by sprinkling the lime into the soil, but it is difficult to thoroughly disseminate the lime throughout the soil, and the result is that some parts of the soil are strongly alkaline while others still remain acid.

The acid condition of the soil which is produced by the use of ammonium sulphate is overcome according to the present invention by mixing with the ammonium sulphate a relatively stable alkaline material which is available for neutralizing the acid formed upon decomposition of the ammonium sulphate by reactions in the soil. If an active material, for example, lime in a finely pulverized state, is added to the ammonium sulphate, it is likely to react with the ammonium sulphate, thereby liberating ammonia which is lost before the fertilizer is added to the soil. Even if such a mixture is added to the soil without the loss of any substantial amount of ammonia, any moisture in the soil causes a reaction between the lime and the ammonium sulphate which liberates ammonia so rapidly that the nitrogen is not available for the plants and a large proportion of it is lost.

As examples of alkaline materials which are relatively stable and are suitable for mixing with ammonium sulphate, I mention limestone, or dolomite, which is a carbonate of calcium and magnesium, although other alkaline materials can be used. It is preferred to employ carbonates of the alkaline earth metals, by which is meant not only calcium, strontium or barium, but also magnesium. In order that there will be substantially no reaction between the ammonium sulphate and the limestone or other alkaline material before the fertilizer is used, and in order that the alkaline material will not be washed away by rain or caused to react with the ammonium sulphate so rapidly that a large proportion of the nitrogen will be lost, but on the contrary, will leave the alkaline material available for neutralizing the acid after the ammonium sulphate has been decomposed, it is necessary that the particle size of the alkaline material be above a certain minimum. If the particle size of the limestone is too large, the reaction is so slow as not to be effective for counteracting the acid formed upon decomposition of the ammonium sulphate. In using limestone or dolomite as an addition to ammonium sulphate, I have found that they should be of such particle size that they will pass through a screen having 20 meshes per lineal inch, but will be retained upon a screen having 50 meshes per lineal inch.

The ingredients are thoroughly mixed in the dry state and are spread on the ground in any desired manner. In order to prevent or decrease segregation of the ammonium sulphate and limestone or dolomite particles, the particles of each of these materials are preferably maintained at about the same size. This insures that there will be a substantially equal distribution of the different particles and that the limestone or dolomite will be available throughout the fertilizer for neutralizing the acid upon decomposition of the ammonium sulphate. I have determined by experiment that there is no objectionable segregation with particles of the size range above specified. This insures that there will be no lack of uniformity in the condition of the soil by reason of the treatment.

The fertilizer preferably comprises about 50% ammonium sulphate and 50% limestone, each ground by any suitable means to such particle size that they will pass through a 20 mesh screen, but be retained upon a 50 mesh screen. These proportions are given by way of example, but may be varied somewhat according to the type of soil to which the fertilizer is to be added and according to the particular alkaline material which is added to the ammonium sulphate. If dolomite is used in place of limestone, it is preferred to use about 35% dolomite and 65% ammonium sulphate and to grind them to the degree above specified.

I have described in detail a present preferred embodiment of my invention and have given the preferred proportions of the different materials.

However, the invention may be otherwise embodied within the scope of the following claims.

I claim:

1. A fertilizer comprising ammonium sulphate, and a sufficient amount of a relatively stable alkaline material having such particle size that it passes through a screen having 20 meshes per inch but is retained upon a screen having 50 meshes per inch to neutralize a substantial portion of the free acid formed by the decomposition of the ammonium sulphate by reactions in the soil.

2. A fertilizer comprising ammonium sulphate, and a sufficient amount of an alkaline earth metal carbonate having such particle size that it passes through a screen having 20 meshes per inch but is retained upon a screen having 50 meshes per inch to neutralize a substantial portion of the free acid formed by the decomposition of the ammonium sulphate by reactions in the soil.

3. A fertilizer comprising ammonium sulphate, and a sufficient amount of limestone of such particle size that it will pass through a screen having 20 meshes per inch but is retained upon a screen having 50 meshes per inch to neutralize a substantial portion of the free acid formed by the decomposition of the ammonium sulphate by reactions in the soil.

4. A fertilizer comprising ammonium sulphate, and a sufficient amount of limestone to neutralize a substantial portion of the free acid formed by the decomposition of the ammonium sulphate by reactions in the soil, both the ammonium sulphate and the limestone having such particle size that they will pass through a screen having 20 meshes per inch but are retained on a screen having 50 meshes per inch.

5. A fertilizer comprising about 50% ammonium sulphate and about 50% limestone, the limestone having a particle size such that it will pass through a sieve having 20 meshes per inch but will be retained on a sieve having 50 meshes per inch.

6. A fertilizer comprising about 50% ammonium sulphate and about 50% limestone, both the ammonium sulphate and the limestone being of such particle size that they will pass through a screen having 20 meshes per inch but will be retained upon a screen having 50 meshes per inch.

7. A fertilizer comprising about 65% ammonium sulphate and about 35% dolomite, the particle size of each material being such that they will pass through a screen having 20 meshes per inch but will be retained upon a screen having 50 meshes per inch.

MILTON W. ST. JOHN.